W. D. DICKSON & A. J. COLE.
Fly-Traps.

No. 154,128.                                                            Patented Aug. 18, 1874.

(Side elevation, with gauze on this side removed).

Figure 1:
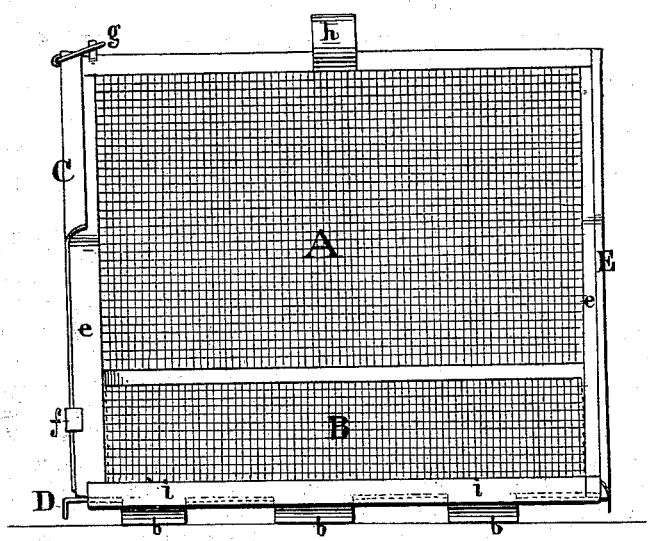

(End view from left of fig. 1. Sliding "End" removed).

Witnesses
James Thurlow.
Clarence Thurlow.

William D. Dickson
by E. Thurlow his Atty in fact
Asa J. Cole
by E. Thurlow his atty in fact

UNITED STATES PATENT OFFICE.

WILLIAM D. DICKSON AND ASA J. COLE, OF PEORIA, ILLINOIS.

IMPROVEMENT IN FLY-TRAPS.

Specification forming part of Letters Patent No. 154,128, dated August 18, 1874; application filed June 3, 1874.

*To all whom it may concern:*

Be it known that we, WILLIAM D. DICKSON and ASA J. COLE, both of the city of Peoria, in the county of Peoria and in the State of Illinois, have invented an Improvement in Fly-Traps; and do hereby declare that the following is a full, clear, and exact description thereof, reference being had to the annexed drawings making a part of this specification, in which like letters of reference refer to like parts, and in which—

Figure 2:
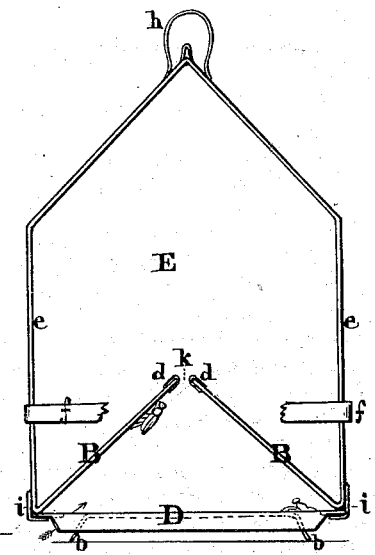
Figure 3:
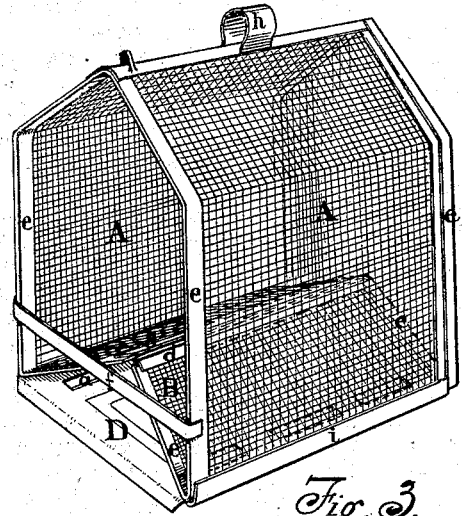
Figure 4:
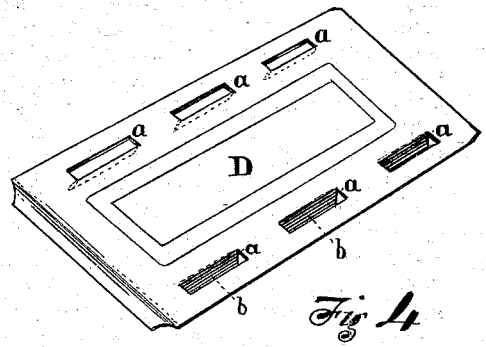

Figure 1 represents a side elevation, the gauze-wire in this side being removed; Fig. 2, end view from the left of Fig. 1, the sliding end C removed; Fig. 3, perspective view of the trap on smaller scale, with the sliding end removed; Fig. 4, perspective view of bottom.

This fly-trap consists of two inclined gauze screens, B B, which approach each other from the lower sides of the trap, and leave between the edges a narrow opening, K, wide enough for the passage of flies upward into the space inclosed by an outer gauze cage, A, which has straight sides running parallel with the lower edges of said inclined screens B B, forming a ridge at the top of the trap, the whole cage resembling a cottage in exterior shape, the ends being inclosed by a flat tin plate or gauze screen. One of these ends, C, opens or is retained by sliding it behind a cross-strip, *f*, fastened at either end to one of the corner-strips *e e*. The bottom, beneath the inclined screens B B, is completely closed by a flat tin plate, D, sliding within cleats or ledge formed by turning up the tin strip *i*, which forms the lower corner or side of the trap, and is perforated or cut in such a manner as to produce a series of openings, *a a a*, &c., therein around the edges, for the treble purposes, first, of the passage upward of the flies from the outside of the trap to the bait; second, to form an inclined approach to said passage; and, third, to form, at the same time, legs *b b b*, &c., or supports for the trap to rest upon.

If this trap is made of a round form this plan of constructing the fly-passages will not interfere with a modified form of the trap and bottom, nor the mode of sliding the same into its place on renewing the bait. So, too, the inclined screens B B may be modified by constructing them in one piece, bent into a ridge or penthouse form, the fly-openings being then made by disconnected slots or holes along the top of the ridge.

The flies enter by the holes *a a a*, &c., in the bottom D, attracted by the sweets placed upon said bottom, and, getting surfeited, begin to pass upward through the narrow opening *k* between the screens B B, where they find themselves caught in the cage A, but will not pass backward down through the said opening *k*. The end C is removable (to throw out the flies after scalding them) from behind the cross-strip *f*, and is a flat tin plate having a collar or portion of its upper part made to lap upon the top of the cage.

The trap is constructed very economically by making the double strips of tin, which inclose and retain the edges of the ends of both the outer cage and the screens B B, each in one piece, continuous. (See Fig. 2.) The gauze is, in like manner, cut in one piece. The whole is easily bent (in five places) to form the roof, sides, and screens below.

The ridge of roof may be strengthened by a strip of tin, with an attached handle, *h*, and a nipple for the retention of the ring *g*, which lifts the sliding end C. The other end of the trap may be soldered or otherwise attached, and may be made of gauze or tin.

What we claim as our invention is—

1. The tin or sheet-iron bottom D, provided with punched apertures *a*, the partially-severed material being bent downward to form holes for the ascent of the flies and legs to support the bottom, as and for the purposes described.

2. In combination with the bottom D, the cage A *e e* B B, formed of one piece, bent in the middle and turned upward at the lower ends to form a narrow slit, *k*, and provided with the cleats *i i*, end pieces C E, and strip *f*, constructed and arranged as described.

In testimony that we claim the foregoing fly-trap, we have hereunto set our hands this 27th day of May, 1874.

WILLIAM D. DICKSON.
ASA J. COLE.

Witnesses:
H. W. WELLS,
CLARENCE THURLOW.